UNITED STATES PATENT OFFICE.

LESTER KIRSCHBRAUN, OF EVANSTON, ILLINOIS.

COLORED BITUMINOUS COMPOSITION AND PROCESS OF MAKING SAME.

1,417,838.

Specification of Letters Patent.   Patented May 30, 1922.

No Drawing. Application filed March 16, 1918, Serial No. 222,938. Renewed October 28, 1921. Serial No. 511,098.

*To all whom it may concern:*

Be it known that I, LESTER KIRSCHBRAUN, a citizen of the United States, residing in the city of Evanston, county of Cook, and State of Illinois, have invented certain new and useful Improvements in Colored Bituminous Compositions and Processes of Making Same, of which the following is a specification.

This invention relates to colored bituminous compositions and process of making same and has among its salient objects to provide a permanently colored bituminous composition of a solid or semi-solid or liquid nature preferably made from commercial petroleum distillate; to provide a product of the character above referred to in which any desired color may be obtained of a pronounced tone or shade and in which there is no tendency for the color to be weakened or overcome by the natural black character of products which have for their base, black residual pitches; to provide a product of the character referred to which is formed primarily from a hydrocarbon base naturally containing a minimum quantity of, or substantially devoid of the black compounds characteristic of asphaltic base hydrocarbons, to provide a product which is adapted for a wide variety of uses for which black asphaltic compounds are not suited because of their unattractive color; to provide a product which is also adapted for use in industries or arts in which the black asphaltic compounds are used but which has the advantage of producing a predetermined color and giving thus a more attractive appearance to the article or material with which it is used as for example, in prepared roofing, paints, floorings, impregnated or saturated fabrics and the like; to provide a simple and economical process for commercially making the product of the present invention.

As is well known asphaltic compositions have certain so called basic advantages: they are water proof, substantially acid proof, cementitious, plastic, and the base from which they are made relatively cheap and available in substantially unlimited quantities. They have however, one predominating and universal characteristic namely they are black. This is true of all residual petroleum pitches heretofore used in the manufacture of solid or semi-solid bituminous products. In attempts heretofore made to mix a pigment or dye with a black residual pitch or asphaltic product the black color has predominated and prevented the attainment of any decided shade other than black. I have discovered that commercial wax tailings preferably treated in a manner hereinafter described can be mixed with a pigment or dye of given color and thus produce a product having a relatively bright color such as green or red or whatever shade may be desired. By wax tailings is generally meant the portion or cut which is the last cut resulting from the distillation of petroleum to coke. These wax tailings are relatively heavy, generally of a yellowish color, extremely sticky, and largely freed of the black constituents of petroleum.

In carrying out my process, I take the commercial wax tailings, preferably those of the lightest or clearest color and subject them to a fractional distillation in the presence of superheated steam.

These wax tailings are distilled down to a solid or semisolid consistency, care being taken to avoid breaking down or decomposition of the hydrocarbons as such decomposition has a tendency to give a black color to the residual product. If the distillation is carried out as above stated the resulting residue I have found in certain instances is even lighter than the original crude wax tailings. The residual pitch thus produced is extremely ductile and has the property of imparting its ductility to non-ductile bitumens when mixed with them even in relatively small quantities. In certain cases I have found that the ductility of the product of certain consistencies will range from fifty to upwards of one hundred times its cross section when subjected to the well known Dow method of test. The consistency of the product depends on the extent to which the distillation is carried. It may be of a consistency suitable for roofing saturations, roof coating, paint bases, or floor cements. The base is prepared from these wax tailings as above specified and is then mixed with a dye such as rhodamine, malachite green or other dye soluble in the base, or instead of dyes the color may be produced by admixture of pigments such as red ochre, chrome green, lead chromate, ultramarine or other pigments which mix with but do not dissolve in the base. Inasmuch as this base made from the wax tailings is of a generally neutral color, being of a yellowish shade I have found that it is necessary to add only a relatively small percentage of dye or pigment. In certain cases the percentage of pigment or dye added may be less than one per cent and I have generally found that from two to ten per cent, depending on the pigment or dye used, is sufficient to give a clear color to the finished product. The base must of course be liquefied by sufficient heat at the time the coloring matter is added.

One illustration of the use to which the product and process may be put is in the manufacture of prepared roofing. The colored compound is prepared in the manner heretofore described preferably with a pigment and the felt run through a tank containing the compound in a hot liquid state. The felt becomes both saturated and coated, the pigment however concentrates in that portion of the compound which forms the coating as the pigment does not readily enter into the body of the felt. The latter thus becomes saturated with substantially the pure base. If however it is desired to carry the color into the body of the felt or other fabric the base is colored with a dye rather than a pigment. If it is desired to cover the coating with a granular facing the gravel or other granular material may be mixed with the colored base in the treating tank before the felt is run through the tank. Thus a granular facing of a given color is produced simultaneously with the operation of saturating and coating. The granular material will become thoroughly coated with the colored compound and will effectively stick to the coating.

Fabric such as canvas, duck or the like can be impregnated with this compound for the purpose of making them water proof and at the same time giving them an attractive color.

I claim as my invention:

1. A prepared bituminous product consisting essentially of a solid body being the residue remaining from the steam distillation of wax tailings, said body being yellowish brown in color and pitchy and having a conchoidal fracture when cold.

2. A process of producing a bituminous composition which consists in distilling with steam wax tailings down to a solid or semisolid residue in such a manner as to avoid decomposition of the hydrocarbons during distillation and then mixing such residue with a coloring matter distinctive in shade.

3. A prepared bituminous product, consisting essentially of a solid body, being the residue remaining from the distillation with an inert gas of wax tailings, said body being yellowish brown pitch, having a conchoidal fracture when cold and being free from any substantial products of decomposition, and a coloring matter intimately mixed with said solid residual product and giving a distinctive color thereto.

4. A process of producing a bituminous composition from wax tailings which consists in subjecting wax tailings obtained from petroleum oil to steam distillation in a relatively closed receptacle down to a solid or semisolid residue and in such a manner as to avoid substantial decomposition of hydrocarbons during distillation and then mixing such residue with a coloring matter.

5. A process of producing a bituminous composition from wax tailings obtained from petroleum oil consisting in distilling said wax tailings in a substantially closed receptacle with steam and carrying on such distillation at such temperatures and with such quantities of steam as will prevent any substantial darkening of the color of the product from that of the original wax tailings.

LESTER KIRSCHBRAUN.